United States Patent
Kang

(10) Patent No.: US 10,936,247 B2
(45) Date of Patent: Mar. 2, 2021

(54) MEMORY CONTROLLER, STORAGE DEVICE INCLUDING THE SAME, AND METHOD OF OPERATING THE MEMORY CONTROLLER

(71) Applicant: Samsung Electronics Co., Ltd., Suwon-si (KR)

(72) Inventor: Nam-wook Kang, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 122 days.

(21) Appl. No.: 16/415,102

(22) Filed: May 17, 2019

(65) Prior Publication Data

US 2020/0117389 A1    Apr. 16, 2020

(30) Foreign Application Priority Data

Oct. 10, 2018  (KR) .......................... 10-2018-0120598

(51) Int. Cl.
| | | |
|---|---|---|
| *G06F 12/00* | (2006.01) | |
| *G06F 13/00* | (2006.01) | |
| *G06F 13/28* | (2006.01) | |
| *G06F 3/06* | (2006.01) | |

(52) U.S. Cl.
CPC .......... *G06F 3/0659* (2013.01); *G06F 3/0604* (2013.01); *G06F 3/0644* (2013.01); *G06F 3/0656* (2013.01); *G06F 3/0679* (2013.01)

(58) Field of Classification Search
CPC .... G06F 3/0604; G06F 3/0659; G06F 3/0644; G06F 16/164
USPC ......................................................... 711/103
See application file for complete search history.

(56) References Cited

U.S. PATENT DOCUMENTS

| | | | |
|---|---|---|---|
| 7,533,215 | B2 | 5/2009 | Faber |
| 8,352,706 | B2 | 1/2013 | Yano et al. |
| 9,195,583 | B2 | 11/2015 | Jung et al. |
| RE46,446 | E | 6/2017 | Lasser |
| 9,891,838 | B2 | 2/2018 | Woo et al. |
| 9,927,985 | B2 | 3/2018 | Zhang et al. |
| 9,940,261 | B2 | 4/2018 | Booth et al. |
| 2008/0201391 | A1* | 8/2008 | Arakawa ............. G06F 11/1471 |
| 2016/0246530 | A1 | 8/2016 | Mylavarapu |
| 2017/0242584 | A1* | 8/2017 | Zhang ................. G06F 12/0246 |

OTHER PUBLICATIONS

IEEE search results, Nov. 6, 2020 (Year: 2020).*

* cited by examiner

*Primary Examiner* — Edward J Dudek, Jr.
*Assistant Examiner* — Sidney Li
(74) *Attorney, Agent, or Firm* — Harness, Dickey & Pierce, P.L.C.

(57) ABSTRACT

A memory controller may include a buffer memory configured to store a plurality of metadata groups and a journal log set for a metadata group of the plurality of metadata groups, wherein the journal log set includes a plurality of journal logs respectively indicating update information for the plurality of metadata groups. The memory controller may include control circuitry configured to identify journal times taken to execute respective journal logs of the plurality of journal logs, identify a prediction time taken to update the metadata group based on the journal log set, and control a number of journal logs included in the journal log set based on the journal times and the prediction time.

20 Claims, 16 Drawing Sheets

FIG. 5A

Journal Time Table For Journal Type $\quad{}^{51}$

| JOURNAL TYPE | JOURNAL TIME |
|---|---|
| JL1 | T1 (1 μs) |
| JL2 | T2 (2 μs) |
| JL3 | T3 (4 μs) |

FIG. 5B

Journal Time Table For Journal Log Set $\quad{}^{52}$

|  | T1 | T2 | T3 | TOTAL TIME |
|---|---|---|---|---|
| JLS1 | 4 | 3 | 0 | 10 μs |
| JLS2 | 2 | 2 | 1 | 10 μs |
| JLS3 | 2 | 4 | 0 | 10 μs |
| JLS4 | 0 | 5 | 0 | 10 μs |
| TOTAL |  |  |  | 40 μs |

FIG. 11

Journal Time Table For Mapping Table — 111

| | T1 | T2 | T3 | TOTAL TIME |
|---|---|---|---|---|
| MAP1 | 4 | 3 | 1 | 14 μs |
| MAP2 | 4 | 3 | 0 | 10 μs |
| MAP3 | 2 | 4 | 0 | 10 μs |
| MAP4 | 0 | 5 | 0 | 10 μs |
| TOTAL | | | | 44 μs |

⇩  111'

| | T1 | T2 | T3 | TOTAL TIME |
|---|---|---|---|---|
| MAP1 | 0 | 0 | 0 | 0 μs |
| MAP2 | 4 | 3 | 0 | 10 μs |
| MAP3 | 2 | 4 | 0 | 10 μs |
| MAP4 | 0 | 5 | 0 | 10 μs |
| TOTAL | | | | 30 μs |

Journal Time

- JL1 : T1 (1μs)
- JL2 : T2 (2μs)
- JL3 : T3 (4μs)

Journal Time Table For Mapping Table (131)

|  | T1 | T2 | T3 | TOTAL TIME |
|---|---|---|---|---|
| MAP1 | 4 | 3 | 0 | 10 μs |
| MAP2 | 4 | 3 | 1 | 14 μs |
| MAP3 | 2 | 4 | 0 | 10 μs |
| MAP4 | 0 | 5 | 0 | 10 μs |
| TOTAL |  |  |  | 44 μs |

(131')

|  | T1 | T2 | T3 | TOTAL TIME |
|---|---|---|---|---|
| MAP1 | 4 | 3 | 0 | 10 μs |
| MAP2 | 0 | 0 | 0 | 0 μs |
| MAP3 | 2 | 4 | 0 | 10 μs |
| MAP4 | 0 | 5 | 0 | 10 μs |
| TOTAL |  |  |  | 30 μs |

US 10,936,247 B2

MEMORY CONTROLLER, STORAGE DEVICE INCLUDING THE SAME, AND METHOD OF OPERATING THE MEMORY CONTROLLER

CROSS-REFERENCE TO RELATED APPLICATION

This application claims the benefit of Korean Patent Application No. 10-2018-0120598, filed on Oct. 10, 2018, in the Korean Intellectual Property Office, the disclosure of which is incorporated herein in its entirety by reference.

BACKGROUND

Some of the inventive concepts of the present disclosure relate to memory controllers, storage devices including memory controllers, and/or methods of operating such memory controllers.

Flash memory that is non-volatile memory may retain stored data even though power is shut off. Recently, storage devices including flash memory such as a solid state drive (SSD) and a memory card have been widely used. Such storage devices use metadata to manage the non-volatile memory. Therefore, it may be advantageous to provide devices and configurations thereof that effectively managing metadata, which may promote the performance of the storage devices.

SUMMARY

Some of the inventive concepts of the present disclosure provide a memory controller that controls a number of journal logs included in a journal log set to maintain an open time of a storage device within a certain level, the storage device including the memory controller, and/or a method of operating the memory controller.

Some example embodiments may include an example memory controller comprising a buffer memory configured to store a plurality of metadata groups and a journal log set for a metadata group of the plurality of metadata groups, wherein the journal log set includes a plurality of journal logs respectively indicating update information for the plurality of metadata groups. The example memory control further comprises control circuitry configured to identify journal times taken to execute respective journal logs of the plurality of journal logs, identify a prediction time taken to update the metadata group based on the journal log set, and control a number of journal logs included in the journal log set based on the journal times and the prediction time.

Some example embodiments may include an example storage device including non-volatile memory. The example storage device may further include a memory controller including control circuitry that is configured to store a plurality of metadata groups and a journal log set for a metadata group of the plurality of metadata groups, wherein the journal log set includes a plurality of journal logs respectively indicating update information for the plurality of metadata groups, identify journal times taken to execute respective journal logs of the plurality of journal logs, and control a number of journal logs included in the journal log set by identifying a first number based on the journal times, and, on condition of a current number of journal logs included in the journal log set reaching the first number, program, to the non-volatile memory, the metadata group and the journal log set for the metadata group.

Some example embodiments may include an example method of managing metadata for a non-volatile memory. The example method may include generating a journal log set of journal logs respectively indicating update information for a metadata group. The example method may include identifying a first number of journal logs to be included in the journal log set, based on journal times for respective journal logs. The example method may include, on condition of a current number of journal logs in the journal log set reaching the first number, programming the metadata group and the journal log set to the non-volatile memory.

BRIEF DESCRIPTION OF THE DRAWINGS

Some example embodiments of some of the inventive concepts may be understood from the following detailed description taken in conjunction with the accompanying drawings in which:

FIG. 5A shows an example of journal times according to some example embodiments;

FIG. 5B shows an example of a journal time table according to some example embodiments;

FIG. 11 is a journal time table according to operation of managing journal log sets such as those shown in FIG. 10;

DETAILED DESCRIPTION

Figure 1:
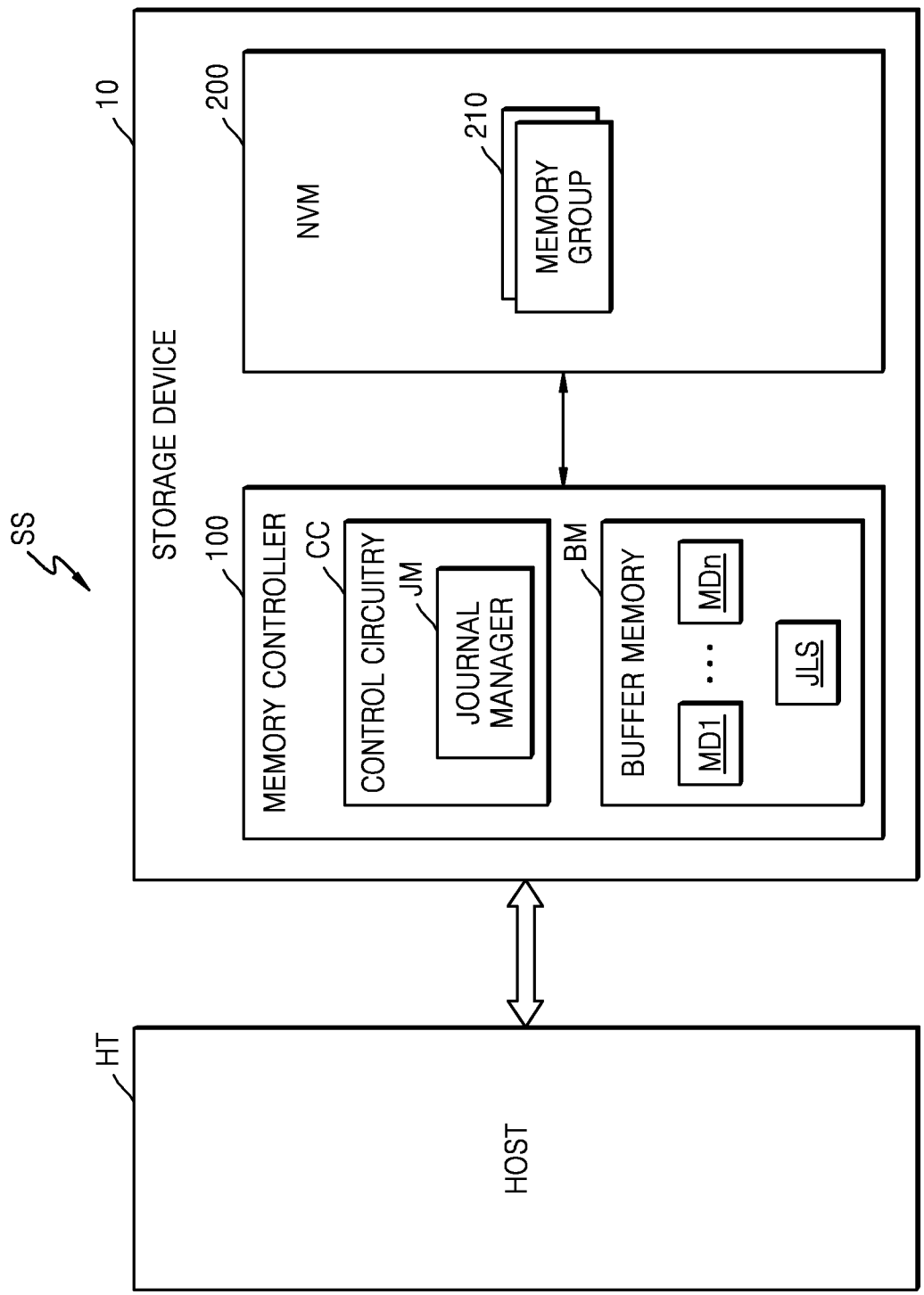
FIG. 1 is a block diagram of a storage system according to some example embodiments.

FIG. 1 is a block diagram of a storage system SS according to some example embodiments.

Referring to FIG. 1, the storage system SS may include a storage device 10 and a host HT, and the storage device 10 may include a memory controller 100 and non-volatile memory (NVM) 200. The host HT may communicate with the storage device 10 through various interfaces. For example, the host HT may be realized as an application processor (AP) or a system-on-chip (SoC). Also, the host HT may be realized as, for example, an integrated circuit, a motherboard, or a database server. However, the host HT is not limited thereto.

The non-volatile memory 200 may include memory groups 210, and each memory group 210 may include memory cells. For example, the memory groups 210 may respectively correspond to pages. In some example embodiments, the non-volatile memory 200 may include a flash memory device, for example, a NAND flash memory device. However, one or more example embodiments of some of the inventive concepts may not be limited thereto. The non-volatile memory 200 may include a resistive memory device such as resistive random access memory (ReRAM), phase change RAM (PRAM), or magnetic RAM (MRAM).

The memory controller 100 may include control circuitry CC and a buffer memory BM. In some example embodiments, the control circuitry CC may be configured to operate as a journal manager JM. In some example embodiments, the buffer memory BM may be realized as an internal memory (e.g., a buffer memory 130 of FIG. 6) of the memory controller 100. FIG. 1 shows that the buffer memory BM is included in the memory controller 100. However, one or more example embodiments of some of the inventive concepts may not be limited thereto. In some example embodiments, the buffer memory BM may be realized as a memory chip, for example, a dynamic RAM (DRAM) chip (e.g., DRAM 300 of FIG. 7), which may be outside a controller chip in which the memory controller 100 is realized.

The buffer memory BM stores metadata, and the control circuitry CC is configured to use the metadata stored in the buffer memory BM to convert a logical address received from the host HT into a physical address of the non-volatile memory 200. Here, the metadata is generated by the control circuitry CC which may be configured to manage user data or the non-volatile memory 200. For example, the metadata may include mapping information used to convert the logical address of the host HT into the physical address of the non-volatile memory 200. Also, the metadata may include, for example, pieces of information used to manage memory space of the non-volatile memory 200.

The metadata may be split into metadata groups MD1 to MDn, and the control circuitry CC may be configured to manage the metadata groups MD1 to MDn, where n is a natural number greater than 1. For example, the metadata groups MD1 to MDn may include mapping tables. In some example embodiments, the metadata may be split into groups based on the logical address, and thus, the metadata groups MD1 to MDn may be generated. In some example embodiments, a size of each of the metadata groups MD1 to MDn may be determined based on a size of the memory group 210 of the non-volatile memory 200. For example, the memory group 210 may correspond to a physical page.

The buffer memory BM may store the metadata groups MD1 to MDn. Also, the buffer memory BM may store a journal log set JLS corresponding to the metadata groups MD1 to MDn. The journal log set JLS may include journal logs, and each journal log may store update information indicating a change in one of the metadata groups MD1 to MDn. According to some example embodiments, the journal log may be referred to as journal data or log data, and the journal log set may be referred to as a journal data set, a log data set, or a journal set. An example of a buffer memory BM is described in FIG. 2.

A journal log may include information that is necessary to restore a change in the metadata. In some example embodiments, the journal log may include information about a type of operation where the metadata is changed, and data used to restore the change in the metadata. The information about the type of operation may include pieces of information that define types of various operations, for example, a program operation, a block allocation operation, and a page copy operation, where the metadata may be changed. The data used to restore the change in the metadata may include a logical address, a previous physical address, a new physical address, and the like.

Figure 2:
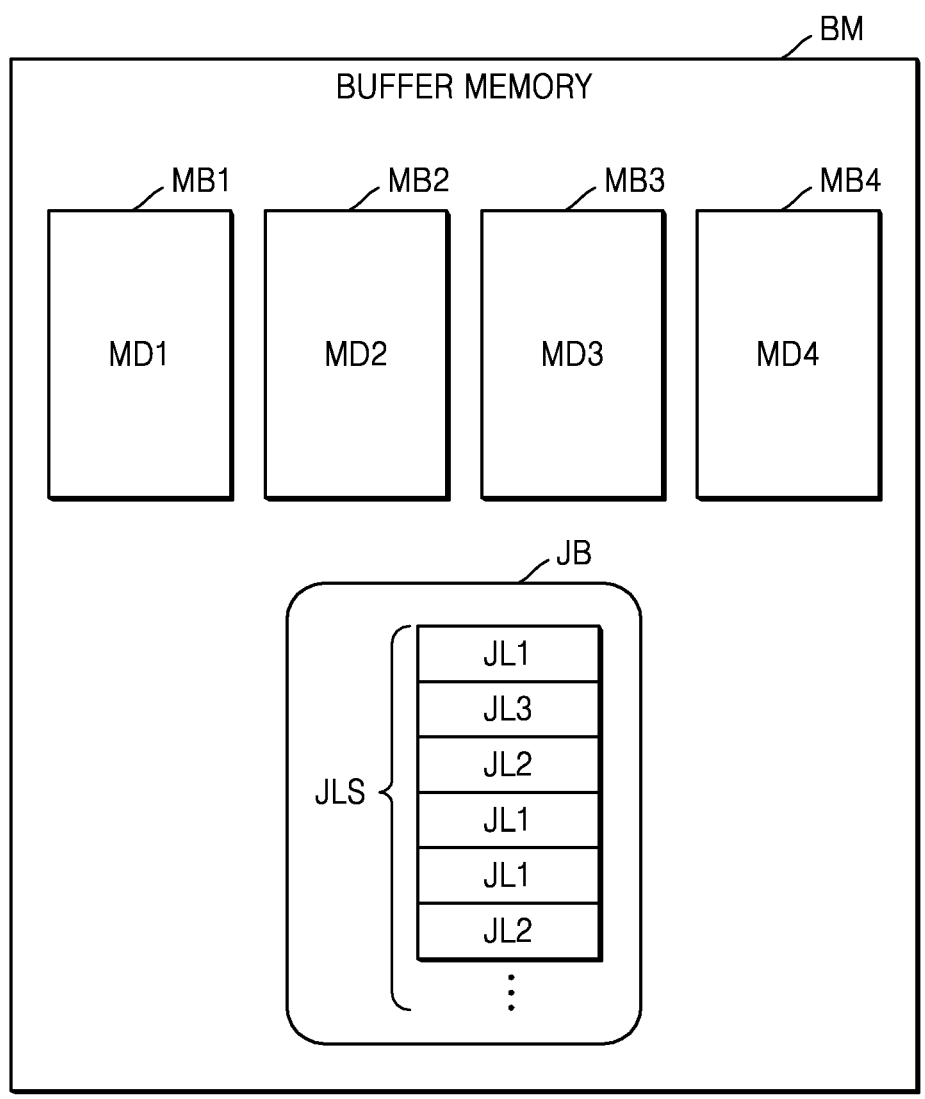
FIG. 2 shows an example of a buffer memory according to some example embodiments.

FIG. 2 shows an example of the buffer memory BM according to some example embodiments.

Referring to FIG. 2, the buffer memory BM may store first to fourth metadata groups MD1 to MD4. For example, the first to fourth metadata groups MD1 to MD4 may be stored in first to fourth metadata buffers MB1 to MB4, respectively. Also, the buffer memory BM may store the journal log set JLS corresponding to the first to fourth metadata groups MD1 to MD4. For example, the journal log set JLS may be stored in a journal buffer JB. As described, the buffer memory BM may include the first to fourth metadata buffers MB1 to MB4, which respectively store the first to fourth metadata groups MD1 to MD4, and the journal buffer JB storing the journal log set JLS.

The journal log set JLS may include first to third journal logs JL1 to JL3. In some example embodiments, the first to third journal logs JL1 to JL3 may be classified according to input/output patterns. For example, the first journal log JL1 may be generated on condition of the metadata being changed according to a write command received from the host HT. For example, the second journal log JL2 may be generated on condition of the metadata being changed according to a read command received from the host HT. For example, the third journal log JL3 may be generated on condition of the metadata being changed according to a trim command received from the host HT. However, one or more embodiments are not limited thereto. The first to third journal logs JL1 to JL3 may be classified in accordance with various criteria, and at least four types of journal logs may be included in the journal log set JLS.

Referring back to FIG. 1, a journal manager JM may be configured to identify (e.g., measure, estimate, and/or predict) journal times taken to execute respective journal logs and may control the number of journal logs included in the journal log set JLS based on the journal times. Also, the journal manager JM may be configured to manage prediction times taken to update the metadata groups MD1 to MDn by using the journal log set JLS and may control the number of journal logs included in the journal log set JLS based on the journal times and the prediction times. For example, the journal manager JM may identify a first number of journal logs to be included in a journal log set, such that when a current number of journal logs in a journal log set reaches the first number, the journal log set is determined to be complete. An example of controlling of the number of journal logs is described in detail in FIGS. 5A and 5B.

On condition of the current number of journal logs included in the journal log set JLS reaching the first number of journal logs that is set in the journal manager JM, the journal manager JM may determine that the journal log set JLS is complete. In other words, the journal manager JM may determine that the journal buffer is full. As described, on condition of completion of the journal log set JLS, the control circuitry CC may be configured to program a metadata groups selected from the metadata groups MD1 to MDn and the journal log set JLS for the selected metadata group to the non-volatile memory 200. As used herein, "program" and "programming" may include storing a metadata group MD and/or a journal log set JLS in a non-volatile memory 200, such as transferring a metadata group MD and/or a journal log set JLS from a volatile memory and/or a first non-volatile memory to a second non-volatile memory, or causing another component of the memory controller 100 to program the metadata group MD and/or the journal log set JLS in the non-volatile memory 200.

Thus, the journal buffer included in the buffer memory BM empties, and new journal logs are stored in the journal buffer, thereby generating a new journal log set. Control circuitry CC, configured to operate as a journal manager JM of the memory controller 100, may be configured to determine completion of the journal log set based on the current number of journal logs included in the journal log set and the first number. On condition of completion of the new journal log set, the memory controller 100 may program another a metadata group selected from the plurality metadata groups MD1 to MDn, and the new journal log set for the selected metadata group to the non-volatile memory 200. As described, the memory controller 100 may sequentially program the journal log sets, which may be sequentially generated, to the non-volatile memory 200.

Figure 3:
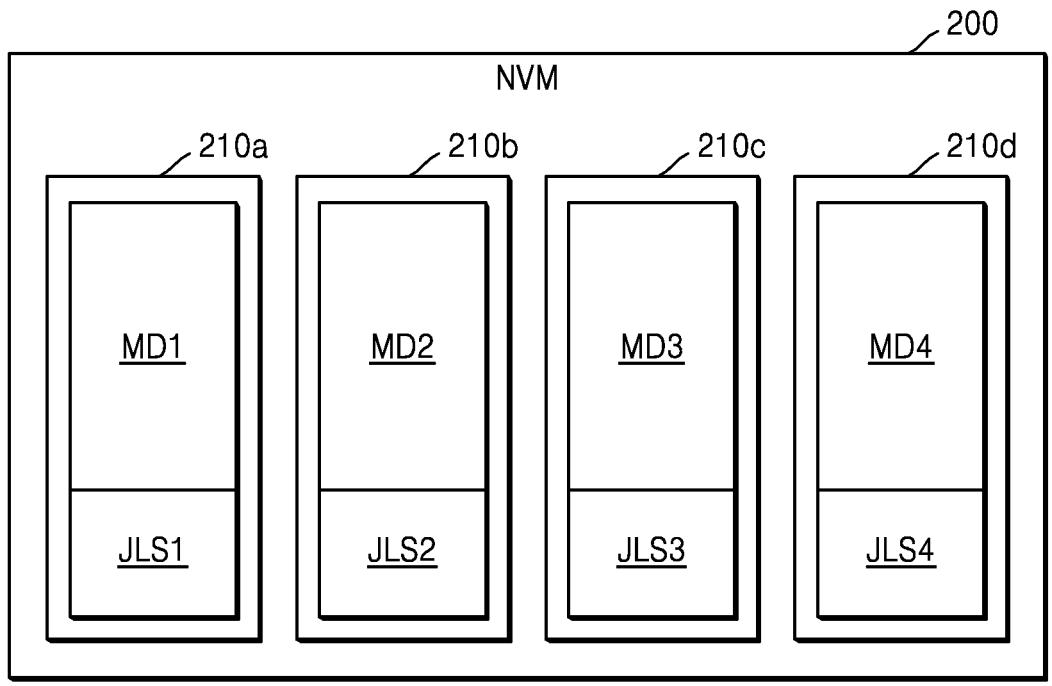
FIG. 3 shows an example of non-volatile memory according to some example embodiments.

FIG. 3 shows an example of the non-volatile memory 200 according to some example embodiments. Hereinafter, referring to FIGS. 1 to 3, example operations of programming metadata groups and journal log sets are described.

The non-volatile memory 200 may include first memory group 210a to fourth memory groups 210d. The memory controller 100 may program a first journal log set JLS1 stored in the journal buffer JB to the first memory group 210a together with a first metadata group MD1. Then, the memory controller 100 may program a second journal log set JLS2 stored in the journal buffer JB to the second memory group 210b together with a second metadata group MD2. Then, the memory controller 100 may program a third journal log set JLS3 stored in the journal buffer JB to the third memory group 210c together with a third metadata group MD3. Then, the memory controller 100 may program a fourth journal log set JLS4 stored in the journal buffer JB to the fourth memory group 210d together with a fourth metadata group MD4. As described, the memory controller 100 may sequentially program the first to fourth metadata groups MD1 to MD4 and the first to fourth journal log sets JLS1 to JLS4 to the non-volatile memory 200.

According to some example embodiments, the memory controller 100 may program the first to fourth metadata groups MD1 to MD4 to the non-volatile memory 200 according to a round-robin method. In other words, after operations of sequentially programming the first to fourth metadata groups MD1 to MD4 and the first to fourth journal log sets JLS1 to JLS4 are complete, the memory controller 100 may program a next generated journal log set stored in the journal buffer JB to the non-volatile memory 200 together with the first metadata group MD1. The disclosure of U.S. Pat. No. 9,195,583 is incorporated herein in its entirety by reference.

Figure 4:
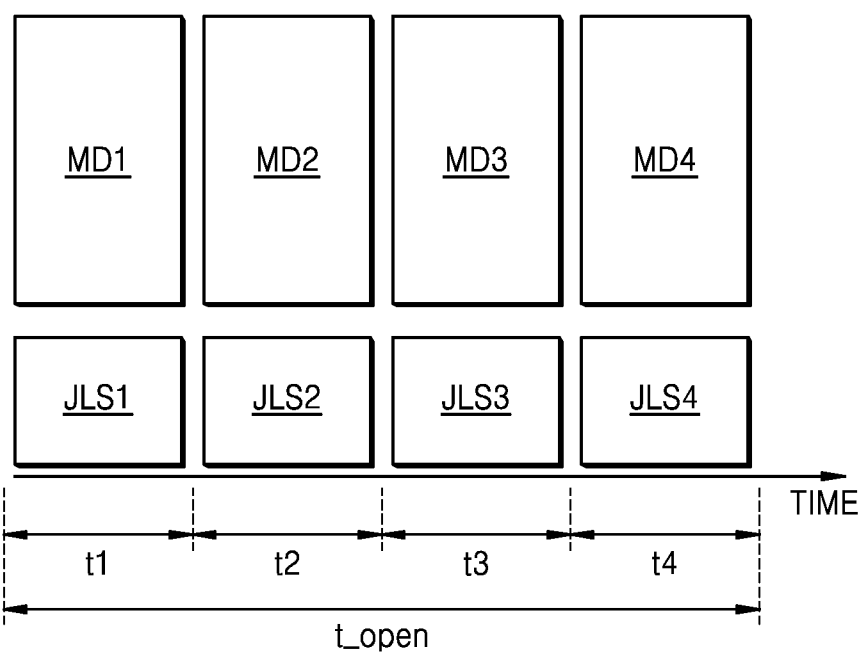
FIG. 4 shows an example of operation of loading metadata groups and journal log sets from non-volatile memory, according to some example embodiments.

FIG. 4 shows an example of operation of loading metadata groups and journal log sets from the non-volatile memory 200, according to some example embodiments.

Referring to FIGS. 1 to 4, on condition of application of power to the storage device 10, the first to fourth metadata groups MD1 to MD4 and the first to fourth journal log sets JLS1 to JLS4, which are programmed to the non-volatile memory 200, may be sequentially loaded in the buffer memory BM. In this case, orders of loading the metadata and replaying journals may be determined according to an order of programming the first to fourth metadata groups MD1 to MD4 and the first to fourth journal log sets JLS1 to JLS4 to the non-volatile memory 200.

The first metadata group MD1 and the first journal log set JLS1, which are programmed to the first memory group 210a, are loaded in the buffer memory BM, and in this case, it may take a first time t1. Since the first metadata group MD1 is programmed to the first memory group 210a in a latest state at a point in time on condition of generation of the first journal log set JLS1 (e.g., when the first journal log set JLS1 is changed, such as upon generating and/or detecting generation of the first journal log set JLS1), the first metadata group MD1 may not be updated by using journal logs included in the first journal log set JLS1. Also, since the second to fourth metadata groups MD2 to MD4 are not loaded yet in the buffer memory BM, the second to fourth metadata groups MD2 to MD4 may not be updated by using journal logs included in the first journal log set JLS1.

The second metadata group MD2 and the second journal log set JLS2, which are programmed to the second memory group 210b, are loaded in the buffer memory BM, the first metadata group MD1 may be updated by using journal logs corresponding to the first metadata group MD1 from among the journal logs included in the second journal log set JLS2, and in this case, it may take a second time t2. Since the second journal log set JLS2 is generated after the first metadata group MD1 is programmed to the first memory group 210a, the first metadata group MD1 may be updated by using the journal logs corresponding to the first metadata group MD1.

Then, the third metadata group MD3 and the third journal log set JLS3, which are programmed to the third memory group 210c, are loaded in the buffer memory BM, the first and second metadata groups MD1 and MD2 may be updated by using journal logs corresponding to the first and second metadata groups MD1 and MD2 from among journal logs included in the third journal log set JLS3, and in this case, it may take a third time t3. Then, the fourth metadata group MD4 and the fourth journal log set JLS4, which are programmed to the fourth memory group 210d, are loaded in the buffer memory BM, the first to third metadata groups MD1 to MD3 may be updated by using journal logs corresponding to the first to third metadata groups MD1 to MD3 from among journal logs included in the fourth journal log set JLS4, and in this case, it may take a fourth time t4.

As described, after the storage device 10 is powered on, the first to fourth metadata groups MD1 to MD4 and the first to fourth journal log sets JLS1 to JLS4 are read from the non-volatile memory 200, and once the first to fourth metadata groups MD1 to MD4 finish being updated by using the read first to fourth journal log sets JLS1 to JLS4, the storage device 10 may process data input/output operations in response to a command received from the host HT. For example, a sum of the first to fourth times t1 to t4 may correspond to an open time t_open of the storage device 10.

In the specification, the open time t_open denotes a time from a point in time when power is applied to the storage device 10 to a point in time when data input/output operations may be processed, and may be referred to as "ready to time". In some scenarios, a first number of journal logs to be included in each journal log set is selected as a fixed number. However, since journal times may differ for different journal log types, the replay time of a corresponding journal log set, in other words, a time taken to update metadata groups by using the corresponding journal log set, may differ according to the types of journal logs included in the journal log set. Therefore, in a power-on state after sudden power-off of the storage device 10, it may be difficult for the open time t_open to remain constant.

FIG. 5A shows an example of a first journal time table 51 including journal times respectively corresponding to journal logs, according to some example embodiments.

Referring to FIGS. 1 and 5A, the journal manager JM may be configured to manage the first journal time table 51 indicating journal times respectively corresponding to the journal logs. Here, the term "journal time" indicates a time taken for firmware, for example, a flash translation layer FTL (e.g., the FTL of FIG. 6), to execute the journal logs. A journal time corresponding to the first journal log JL1 may be a first journal time T1. For example, the first journal time T1 may be 1 μs. A journal time corresponding to the second journal log JL2 may be a second journal time T2. For example, the second journal time T2 may be 2 μs. A journal time corresponding to the third journal log JL3 may be a third journal time T3. For example, the third journal time T3 may be 4 μs. In the first journal time table 51, journal times for more types of journal logs may be stored.

FIG. 5B shows an example of a second journal time table 52 including prediction times corresponding to journal log sets, according to some example embodiments.

Referring to FIGS. 1, 5A, and 5B, the journal manager JM may be configured to manage the second journal time table 52 indicating the prediction times respectively corresponding to the journal logs sets. Here, the term "prediction time" indicates a time taken to update metadata groups by using journal logs included in a journal log set. The journal manager JM may control the number of journal logs included in each of the first to fourth journal log sets JLS1 to JLS4, based on the first journal time table 51 and the second journal time table 52.

For example, on condition of storage in the first journal log set JLS1 of four first journal logs JL1 and three second journal logs JL2, a prediction time of the first journal log set JLS1 may be 10 μs. For example, on condition of storage in the second journal log set JLS2 of two first journal logs JL1, two second journal logs JL2, and one third journal log JL3, a prediction time of the second journal log set JLS2 may be 10 μs. For example, on condition of storage in the third journal log set JLS3 of two first journal logs JL1 and four second journal logs JL2, a prediction time of the third journal log set JLS3 may be 10 μs. For example, on condition of storage in the fourth journal log set JLS4 of five second journal logs JL2, a prediction time of the fourth journal log set JLS4 may be 10 μs. Thus, an open time of sequentially replaying the first to fourth journal log sets JLS1 to JLS4 may be estimated as 40 μs.

Referring back to FIG. 1, the journal manager JM may be configured to manage the first journal time table 51 and second journal time table 52 shown in FIGS. 5A and 5B and may control the number of journal logs included in the journal log set JLS, based on the first journal time table 51 and the second journal time table 52. Accordingly, an open time of the storage device 10 may remain constant, and thus, a maximum response time of the storage device 10 may be managed.

In some example embodiments, the journal manager JM may determine a time slice corresponding to the journal log set JLS and may control the number of journal logs included in the journal log set JLS, based on the journal times and the time slice. In some example embodiments, the journal manager JM may determine time slices based on the number of metadata groups MD1 to MDn in the plurality of metadata groups included in the buffer memory BM. An example of controlling of the number of journal logs is described in detail in FIG. 8.

In some example embodiments, the journal manager JM may sequentially generate journal log sets corresponding to the number of metadata groups MD1 to MDn in the plurality of metadata groups included in the buffer memory BM. For example, as shown in FIG. 3, the journal manager JM may sequentially generate the first to fourth journal log sets JLS1 to JLS4. In this case, the journal manager JM may determine a time window corresponding to the journal log sets and may control the number of journal logs included in each journal log set, based on the time window. For example, on condition of an accumulated prediction time for previously generated journal log sets exceeding a threshold time, the journal manager JM may reduce the number of journal logs that are to be included in the next generated journal log set. An example of controlling the number of journal logs is described in FIG. 9.

In some example embodiments, the journal manager JM may generate prediction times for respective journal log sets based on the journal times, and may store the prediction times in a journal time table (e.g., the second journal time table 52 of FIG. 5B). As shown in FIG. 5B, for example, the journal manager JM may generate the prediction times respectively for the first to fourth journal log sets JLS1 to JLS4 and may update the second journal time table 52 by storing the updated prediction times, based on the journal times of the first to third journal logs JL1 to JL3.

In some example embodiments, the journal manager JM may generate the prediction times respectively for the metadata groups MD1 to MDn and may update the prediction times in a journal time table (e.g., a journal time table 111 of FIG. 11 and a journal time table 131 of FIG. 13), based on the journal times. In some example embodiments, the journal manager JM may select a first metadata group, of which a prediction time exceeds a threshold time, from among the metadata groups MD1 to MDn, may determine the first metadata group as a longest metadata group, and may program the longest metadata group to the non-volatile memory 200. Some example embodiments are described in FIGS. 10 and 11.

In some example embodiments, on condition of a total prediction time of the metadata groups MD1 to MDn exceeding a threshold time, the journal manager JM may select a second metadata group having the longest prediction time from among the metadata groups MD1 to MDn, may determine the second metadata group as a latest metadata group, and may control the second metadata group to be programmed to the non-volatile memory 200. An example embodiment is described in FIGS. 12 and 13.

The storage system SS may be implemented as, for example, a personal computer (PC), a data server, network-attached storage, an Internet of Things (IoT) device, or a portable electronic device. The portable electronic device may be a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book reader, a wearable device, or the like.

In some example embodiments, the storage device 10 may be an internal memory embedded in an electronic device. For example, the storage device 10 may be an SSD, an embedded universal flash storage (UFS) memory device, or an embedded multi-media card (eMMC). In some example embodiments, the storage device 10 may be an external memory detachable from an electronic device. For example, the storage device 10 may be a UFS memory card, a compact flash (CF) card, a secure digital (SD) card, a micro secure digital (Micro-SD) card, a mini secure digital (Mini-SD) card, an extreme Digital (xD) card, or a memory stick.

Figure 6:
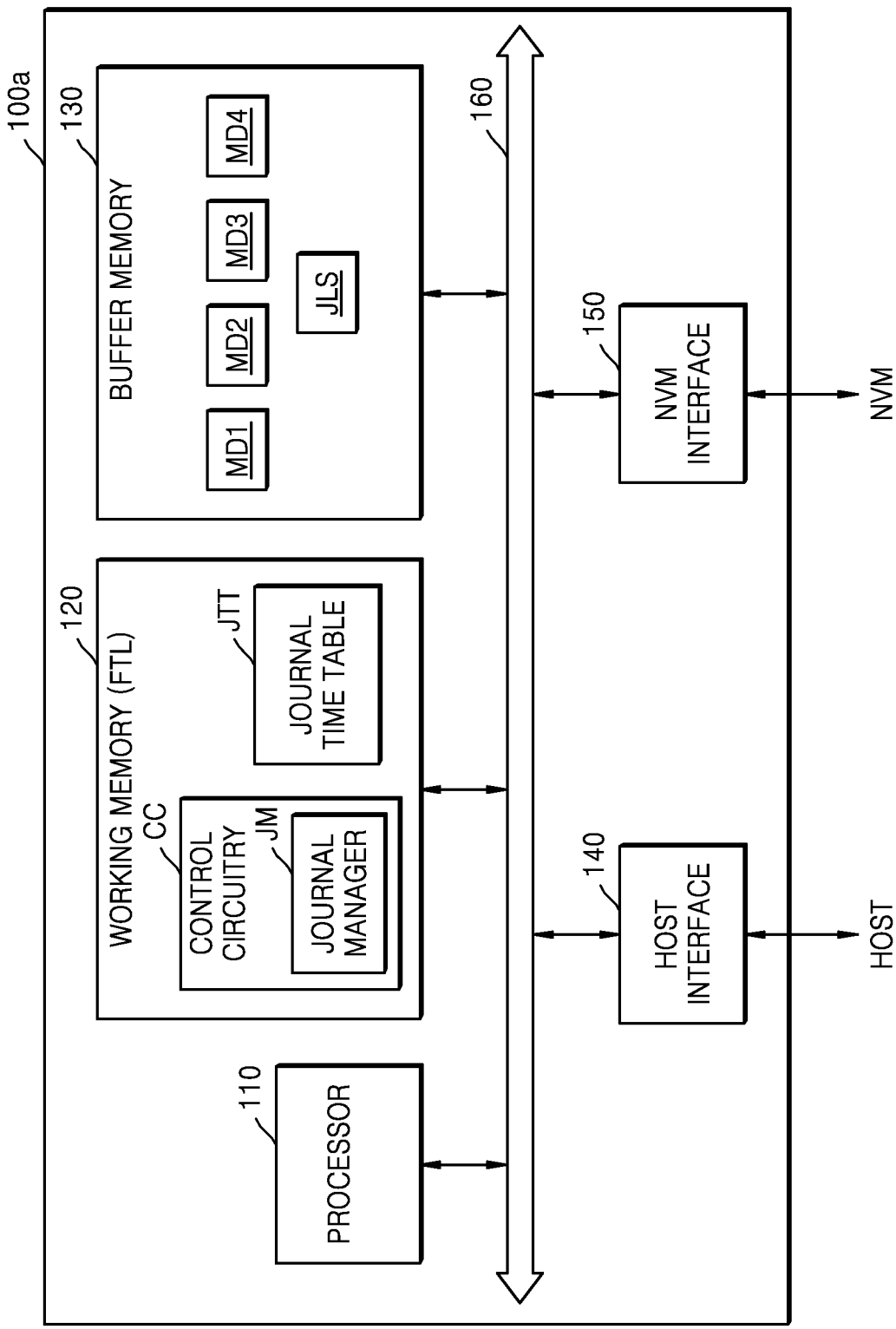
FIG. 6 is a block diagram of an example of a memory controller according to some example embodiments.

FIG. 6 is a block diagram of an example of a memory controller 100a according to some example embodiments. Referring to FIG. 6, the memory controller 100a may include a processor 110, a working memory 120, a buffer memory 130, a host interface 140, and a non-volatile memory interface 150, all of which may communicate with each other via a bus 160. The processor 110 may include a central processing unit (CPU), a microprocessor, and the like and may control all operations of the memory controller 100a. In some example embodiments, the processor 110 may be realized as a multicore processor or may be realized as, for example, a dual-core processor or a quad-core processor. In another embodiment, the memory controller 100a may include control circuitry CC such as hardware including logic circuits, a processing unit including software and a core executing the software, or a combination of the hardware and the processing unit. For example, the control circuitry may include, but is not limited to, a processor, Central Processing Unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

In some example embodiments, the memory controller 100a, including the control circuitry CC, may include flash cores (F-cores), of which the number corresponds to the number of non-volatile memory chips electrically connected to the memory controller 100a or the number of channels between the memory controller 100a and the non-volatile memory 200, and a central core that manages the F-cores. In this case, the F-cores may respectively execute journal managers, and the journal managers may respectively manage the journal log sets.

The journal manager JM and a journal time table JTT may be loaded in the working memory 120. The journal manager JM may be realized as firmware or software and may be loaded in the working memory 120. However, one or more embodiments are not limited thereto. In some example embodiments, the journal manager JM may be realized as hardware and may be located outside the working memory 120. For example, the journal time table JTT may include the first journal time table 51 and the second journal time table 52 shown in FIGS. 5A and 5B. In the working memory 120, the FTL executable by the processor 110 may be stored.

In the buffer memory 130, the first to fourth metadata groups MD1 to MD4 and the journal log set JLS may be stored. In some example embodiments, the working memory 120 and the buffer memory 130 may be realized as an integrated memory chip. In other example embodiments, the working memory 120 and the buffer memory 130 may be realized as separate memory chips. In some example embodiments, the working memory 120 may be realized as volatile memory such as DRAM or static RAM (SRAM) or non-volatile memory such as PRAM or flash memory. In some example embodiments, the buffer memory 130 may be realized as volatile memory such as DRAM or static RAM (SRAM) or non-volatile memory such as PRAM or flash memory.

The host interface 140 may provide an interface between the host HT and the memory controller 100a and may provide an interface according to, for example, universal serial bus (USB), an MMC, PCI Express (PCI-E), AT Attachment (ATA), Serial AT Attachment (SATA), Parallel AT Attachment (PATA), Small Computer System Interface (SCSI), Serial Attached SCSI (SAS), Enhanced Small Disk Interface (ESDI), Integrated Drive Electronics (IDE), or the like.

The non-volatile memory interface 150 may provide an interface between the memory controller 100a and the non-volatile memory 200. For example, the first to fourth metadata groups MD1 to MD4, the journal log set JLS, write data, and read data may be exchanged between the memory controller 100a and the non-volatile memory 200 via the non-volatile memory interface 150. In some example embodiments, the number of non-volatile memory interfaces 150 may correspond to the number of non-volatile memory chips included in the storage device 10 or the number of channels between the memory controller 100a and the non-volatile memory 200.

Figure 7:
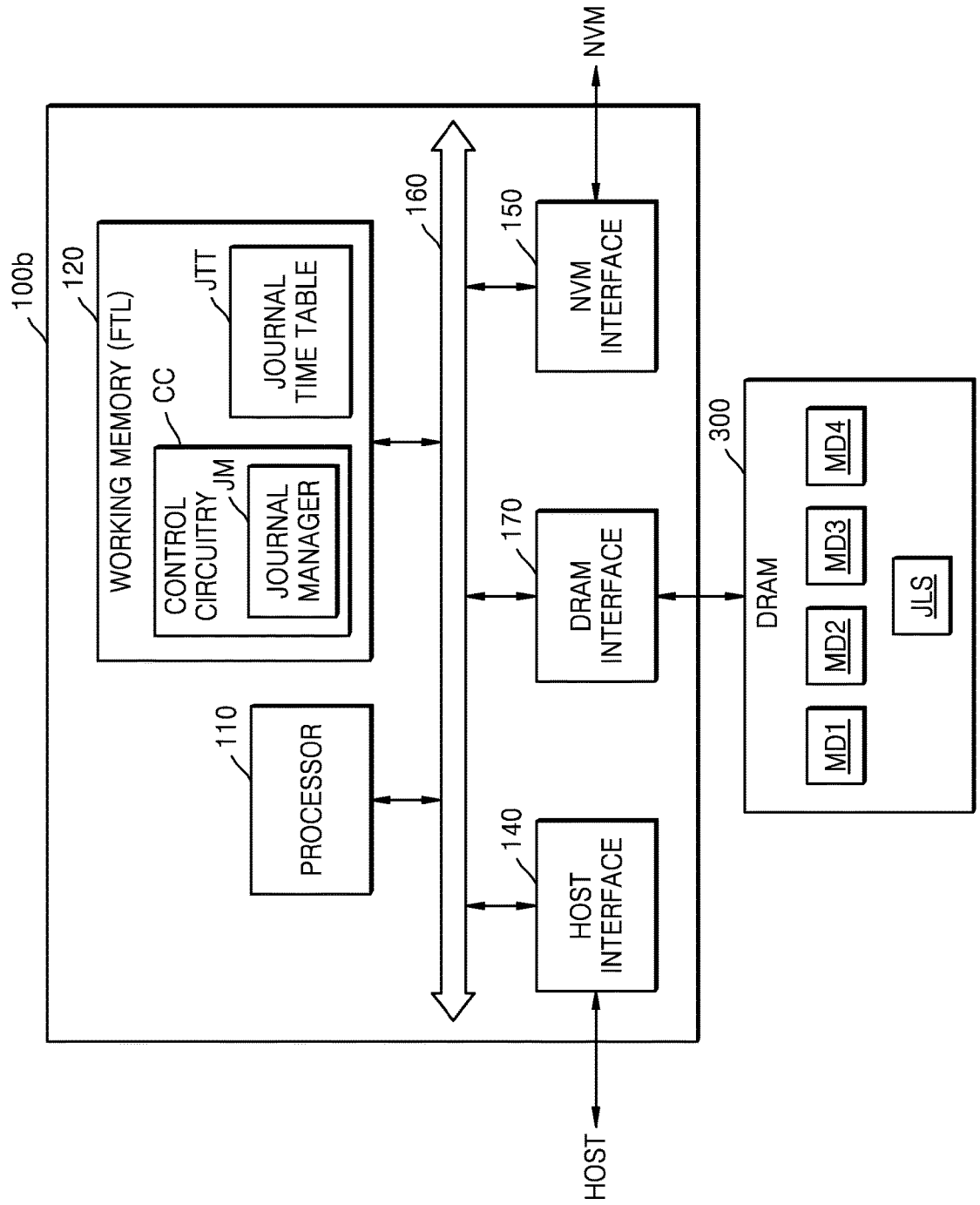
FIG. 7 is a block diagram of another example of the memory controller according to some example embodiments.

FIG. 7 is a block diagram of another example of the memory controller 100b according to some example embodiments.

Referring to FIG. 7, the memory controller 100b may include the processor 110, the working memory 120, the host interface 140, the non-volatile memory interface 150, and a DRAM interface 170, all of which may communicate with each other via the bus 160. The memory controller 100b according to some example embodiments may correspond to a modified example of the memory controller 100a of FIG. 6, and some features of FIG. 6 may apply even if not described in the context of FIG. 7. According to some example embodiments, the buffer memory may be realized as the DRAM 300 outside the memory controller 100b. The DRAM interface 170 may provide an interface between the memory controller 100b and the DRAM 300. For example, some data included in the first to fourth metadata groups MD1 to MD4 and the journal log set JLS may be exchanged between the memory controller 100b and the DRAM 300 via the DRAM interface 170.

Figure 8:
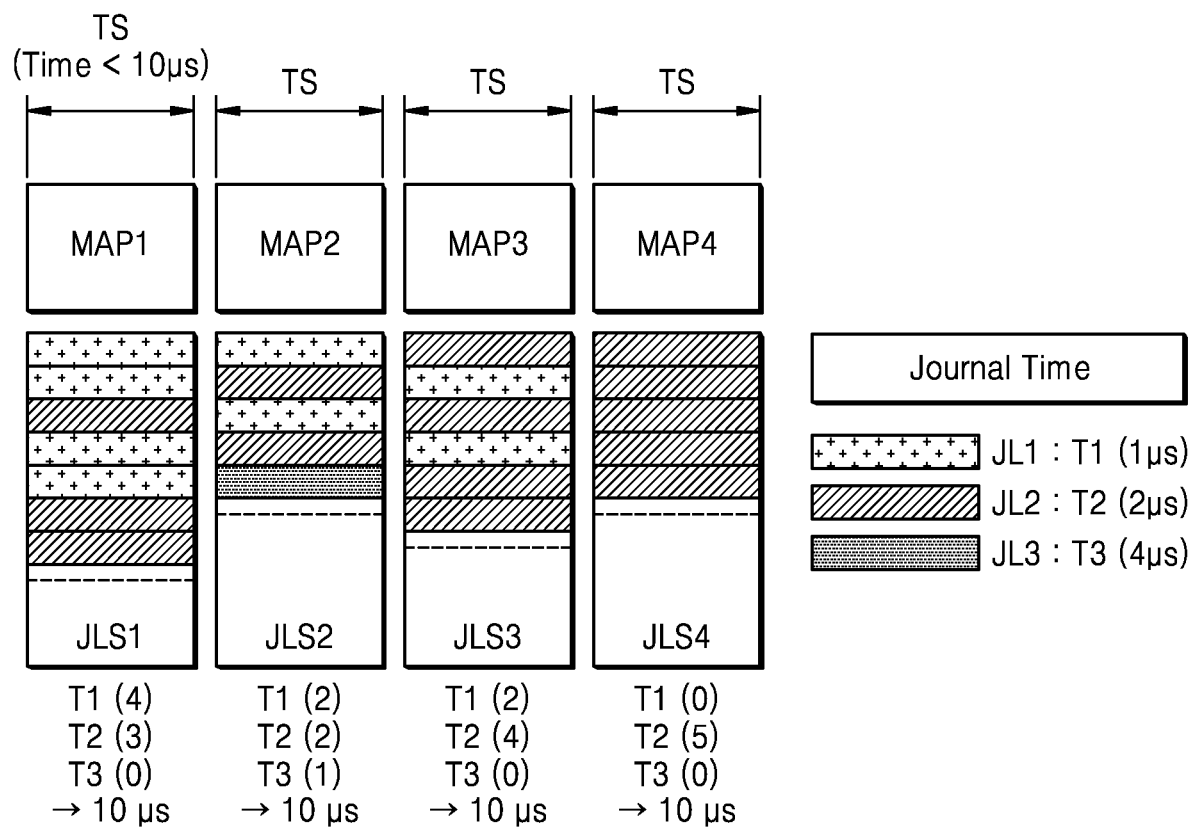
FIG. 8 shows an example of operation of managing journal log sets, according to some example embodiments.

FIG. 8 shows an example of operation of managing journal log sets, according to some example embodiments.

Referring to FIGS. 1 and 8, the journal manager JM may determine time slices TS corresponding to the journal log sets JLS and may determine the first number of journal logs to be included in the journal log set JLS based on the determined time slices TS and journal times. In some example embodiments, the journal manager JM may determine the time slices TS based on an open time and the number of metadata groups MD1 to MDn in the plurality of metadata groups stored in the buffer memory BM. In this case, the number of metadata groups MD1 to MDn in the plurality of metadata groups stored in the buffer memory BM may correspond to the number of journal log sets programmed to the non-volatile memory 200. In some example embodiments, the journal manager JM may divide the open time of the storage device 10 by the number of journal log sets loaded in the buffer memory BM within the open time of the storage device 10, and may set a time, that is, the time slice TS, to be assigned to each journal log set.

For example, the open time of the storage device 10 may be determined to be less than or equal to 40 µs, and first to fourth mapping tables MAP1 to MAP4 may be stored in the buffer memory BM. Here, the first to fourth mapping tables MAP1 to MAP4 may correspond to an example of the metadata groups MD1 to MDn. In this case, the journal manager JM may divide the open time (i.e., 40 μs) by 4 that is the number of mapping tables and may determine the time slice TS for each of the first to fourth journal log sets JLS1 to JLS4 to be less than or equal to 10 μs.

On condition of storage in the journal log set JLS of four first journal logs JL1 and three second journal logs JL2, the journal manager JM may determine that the journal log set JLS is complete based on the time slices TS and the journal times. In this case, the memory controller 100 may program the first mapping table MAP1 and the first journal log set JLS1 to the non-volatile memory 200. Then, on condition of storage in the journal log set JLS of two first journal logs JL1, two second journal logs JL2, and one third journal log JL3, the journal manager JM may determine that the journal log set JLS is complete. In this case, the memory controller 100 may program the second mapping table MAP2 and the second journal log set JLS2 to the non-volatile memory 200.

Then, on condition of storage in the journal log set JLS of two first journal logs JL1 and four second journal logs JL2, the journal manager JM may determine that the journal log set JLS is complete. In this case, the memory controller 100 may program the third mapping table MAP3 and the third journal log set JLS3 to the non-volatile memory 200. Then, on condition of storage in the journal log set JLS of five second journal logs JL2, the journal manager JM may determine that the journal log set JLS is complete. In this case, the memory controller 100 may program the fourth mapping table MAP4 and the fourth journal log set JLS4 to the non-volatile memory 200.

As described, according to some example embodiments, since the first number of journal logs to be stored in the journal log set JLS is determined based on the time slices TS and journal times, the first number of journal logs to be stored in each of the first to fourth journal log sets JLS1 to JLS4 may differ. For example, since the second journal log set JLS2 includes the third journal log JL3 having the longest journal time, the first number of journal logs to be included in the second journal log set JLS2 may be the smallest. For example, since the first journal log set JLS1 includes a largest number of the first journal logs JL1 having the shortest journal time, the first number of journal logs to be included in the first journal log set JLS1 may be the largest.

According to some example embodiments, on condition of application of power to the storage device 10, the first to fourth mapping tables MAP1 to MAP4 and the first to fourth journal log sets JLS1 to JLS4 are sequentially read from the non-volatile memory 200, and a time taken to update the first to fourth mapping tables MAP1 to MAP4 by using the first to fourth journal log sets JLS1 to JLS4 may be 40 μs. Therefore, the open time of the storage device 10 may remain constant.

Figure 9:
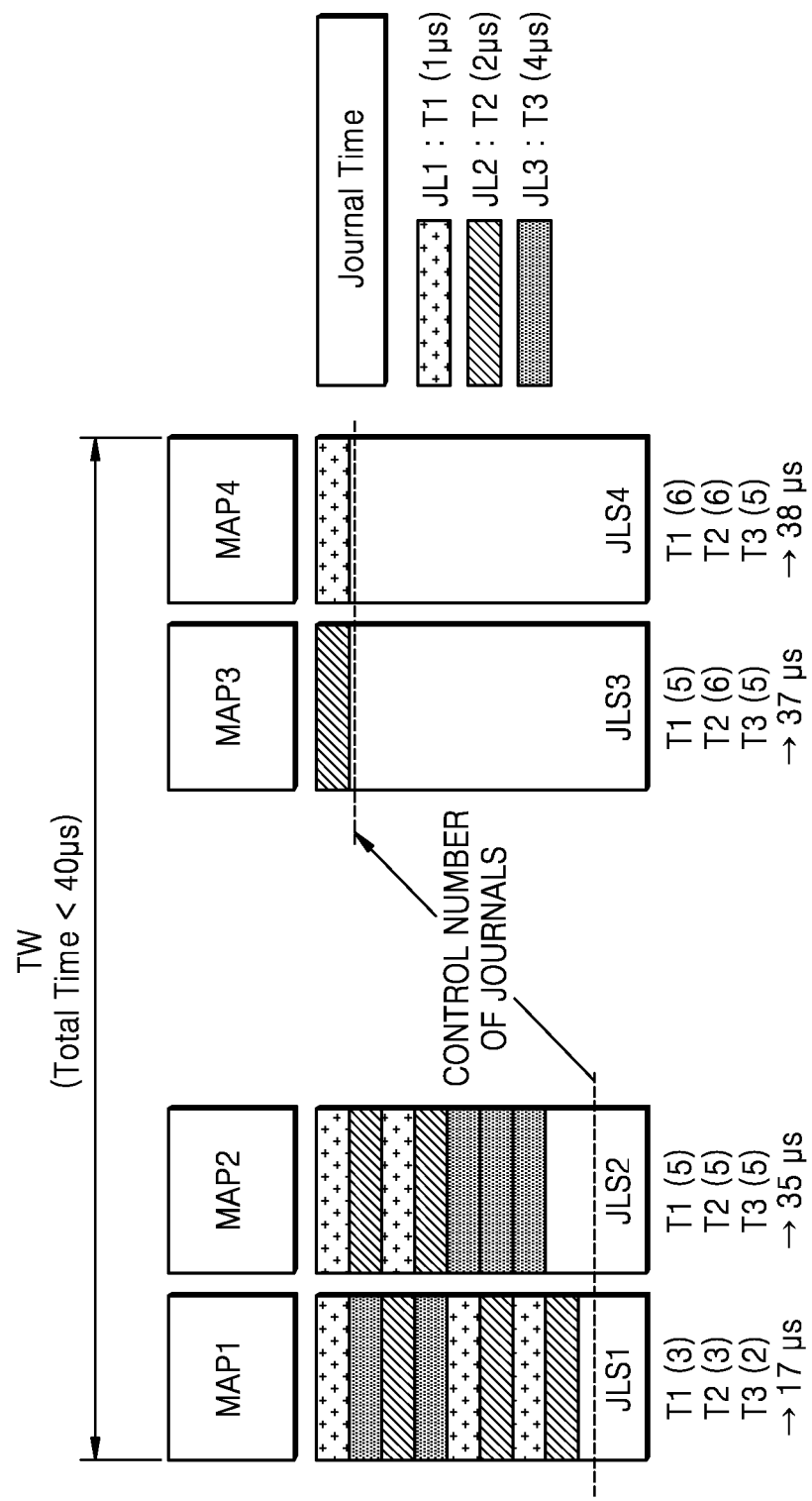
FIG. 9 shows another example of operation of managing journal log sets, according to some example embodiments.

FIG. 9 shows another example of operation of managing journal log sets, according to some example embodiments.

Referring to FIGS. 1 and 9, the journal manager JM may determine a time window TW corresponding to the total number of journal log sets and may determine the first number of journal logs to be included in the journal log set JLS, based on the determined time window TW and the journal times. In some example embodiments, the journal manager JM may determine the time window TW based on the open time, and on condition of an accumulated prediction time for previously generated journal log sets approaching the time window TW (for example, on condition of the accumulated prediction time exceeding a threshold time), the journal manager JM may reduce the first number of journal logs to be included in a next generated journal log set.

For example, the open time of the storage device 10 may be determined to be less than or equal to 40 μs, and the first to fourth mapping tables MAP1 to MAP4 may be stored in the buffer memory BM. The first to fourth mapping tables MAP1 to MAP4 may correspond to the example of the metadata groups MD1 to MDn. In this case, the journal manager JM may determine the time window TW corresponding to the first to fourth journal log sets JLS1 to JLS4 to be less than or equal to 40 μs, based on the open time.

For example, for the first journal log set JLS1 including three first journal logs JL1, three second journal logs JL2, and two third journal logs JL3, a prediction time corresponding to the first journal log set JLS1 may be 17 μs (that is, 3*1+3*2+2*4=17). For example, for the second journal log set JLS2 including two first journal logs JL1, two second journal logs JL2, and three third journal logs JL3, a prediction time corresponding to the second journal log set JLS2 may be 18 μs (that is, 2*1+2*2+3*4=18). In this case, an accumulated prediction time for the first and second journal log sets JLS1 and JLS2 is 35 μs.

On condition of the accumulated prediction time for the first and second journal log sets JLS1 and JLS2 approaching the time window TW (e.g., upon detecting that the accumulated prediction time is within a threshold of the time window TW), the journal manager JM may reduce the first number of journal logs included in each of the third and fourth journal log sets JLS3 and JLS4. In some example embodiments, the journal manager JM may have previously set a threshold time (e.g., 30 μs) based on the time window TW, and on condition of the accumulated prediction time for the first and second journal log sets JLS1 and JLS2 exceeding the threshold time, the first number of journal logs included in each of the third and fourth journal log sets JLS3 and JLS4 may be reduced based on the time window TW.

For example, the journal manager JM may determine the first number of journal logs to be included in each of the third and fourth journal log sets JLS3 and JLS4 to be 1. On condition of storage in the third journal log set JLS3 of one second journal log JL2, an accumulated prediction time for the first to third journal log sets JLS1 to JLS3 is 37 μs. On condition of storage in the fourth journal log set JSL4 of one first journal log JL1, an accumulated prediction time for the first to fourth journal log sets JLS1 to JLS4 is 38 μs, which is less than the time window TW.

However, one or more embodiments are not limited thereto. In some example embodiments, the journal manager JM may determine the first number of journal logs to be stored in the third and fourth journal log sets JLS3 and JLS4 to be 0. In other words, on condition of the accumulated prediction time for the first and second journal log sets JLS1 and JLS2 exceeding the threshold time, it may be determined that the third and fourth journal log sets JLS3 and JLS4 are empty. In this case, the accumulated prediction time for the first to fourth journal log sets JLS1 to JLS4 is 35 μs, which is less than the time window TW.

According to some example embodiments, on condition of application of power to the storage device 10, the first to fourth mapping tables MAP1 to MAP4 and the first to fourth journal log sets JLS1 to JLS4 are sequentially read from the non-volatile memory 200, and a time taken to update the first to fourth mapping tables MAP1 to MAP4 by using the first to fourth journal log sets JLS1 to JLS4 may be 38 μs. Therefore, the open time of the storage device 10 may remain constant.

Figure 10:
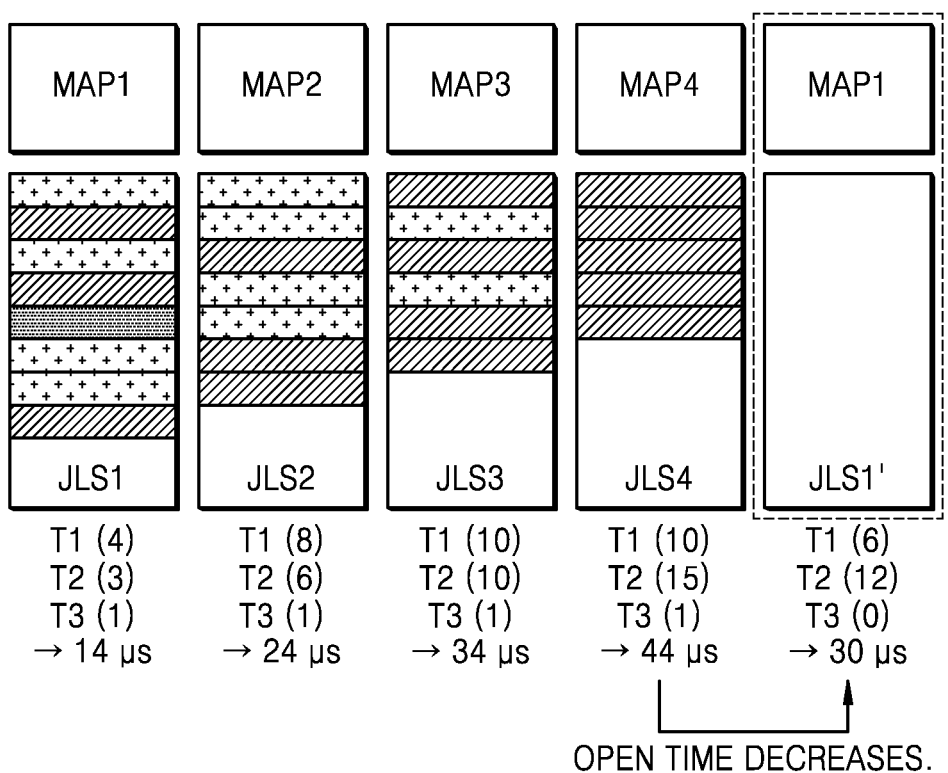
FIG. 10 shows another example of operation of managing journal log sets, according to some example embodiments.

FIG. 10 shows another example of operation of managing journal log sets, according to some example embodiments, and FIG. 11 is a journal time table according to operation of managing journal log sets, such as those shown in FIG. 10.

Referring to FIGS. 1, 10, and 11, the journal manager JM may be configured to manage the prediction times for the metadata groups MD1 to MDn and may update the journal time table 111 in which the prediction times for the metadata groups MD1 to MDn are stored. In some example embodiments, the journal manager JM may select a first metadata group of which the prediction time exceeds the threshold time and may determine the selected first metadata group as a latest metadata group. Then, the memory controller 100 may program the latest metadata group to the non-volatile memory 200. In this case, update information is reflected to the latest metadata group programmed to the non-volatile memory 200.

As described with reference to FIG. 4, on condition of powering on the storage device 10, an order of loading the metadata groups and an order of replaying journal log sets may follow an order of programming the metadata groups and the journal log sets to the non-volatile memory 200. Therefore, the latest metadata group (e.g., the fourth journal log set JLS4) programmed to the non-volatile memory 200 is loaded in the buffer memory BM the latest, and the latest metadata group may not be updated. Accordingly, on condition of powering on the storage device 10, the latest metadata group may not be updated, and thus, the open time of the storage device 10 may remain constant.

For example, the first to fourth mapping tables MAP1 to MAP4 may be stored in the buffer memory BM. The first to fourth mapping tables MAP1 to MAP4 may correspond to an example of the metadata groups MD1 to MDn. The journal manager JM may update the prediction times for the first to fourth mapping tables MAP1 to MAP4 in the journal time table 111.

In some example embodiments, the journal manager JM may select the first mapping table MAP1, of which the prediction time exceeds the threshold time (e.g., 10 μs), in the journal time table 111 and may determine the first mapping table MAP1 as the latest mapping table. Accordingly, the memory controller 100 may program the first mapping table MAP1, to which the update information is reflected, to the non-volatile memory 200. For example, a journal log set JLS1', which is programmed to the non-volatile memory 200 together with the first mapping table MAP1, may be determined to be in an empty state in which the journal logs are not included. However, one or more embodiments are not limited thereto.

Then, the journal manager JM may update the journal time table 111 as a journal time table 111'. According to the updated journal time table 111', a total prediction time taken to update the first to fourth mapping tables MAP1 to MAP4 may be 30 μs, which may be shorter than an open time (e.g., a target or threshold duration). Therefore, a maximum response time of the storage device 10 may be within the open time.

Figure 12:
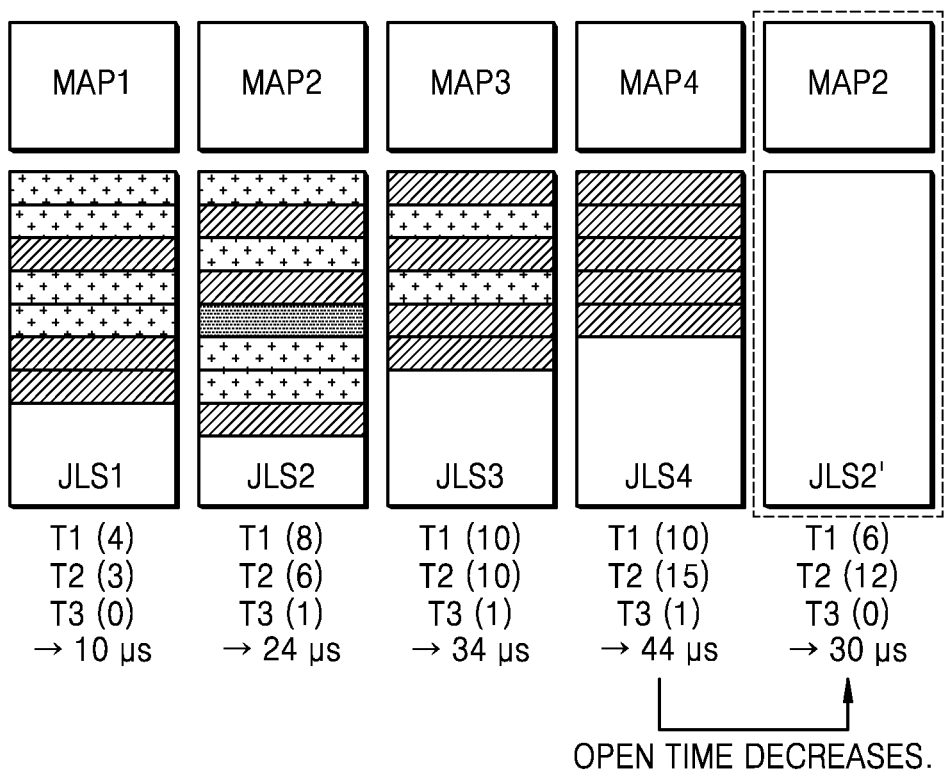
FIG. 12 shows another example of operation of managing journal log sets, according to some example embodiments.
Figure 13:
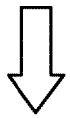
FIG. 13 is a journal time table according to operation of managing journal log sets such as those shown in FIG. 12.
Figure 13:
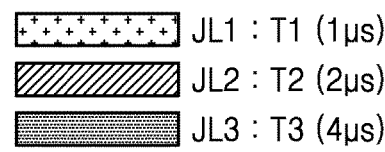

FIG. 12 shows another example of operation of managing journal log sets, according to some example embodiments. FIG. 13 is a journal time table according to operation of managing journal log sets, such as those shown in FIG. 12.

Referring to FIGS. 1, 12, and 13, the journal manager JM may be configured to manage prediction times for the metadata groups MD1 to MDn and may update a journal time table 131 in which the prediction times for the metadata groups MD1 to MDn are stored. In some example embodiments, on condition of a total prediction time for the metadata groups MD1 to MDn exceeding a threshold time, the journal manager JM may select the second metadata group having the longest prediction time from among the metadata groups MD1 to MDn and may determine the selected second metadata group as a latest metadata group. Then, the memory controller 100 may program the latest metadata group to the non-volatile memory 200. In this case, update information is reflected to the latest metadata group programmed to the non-volatile memory 200.

For example, the first to fourth mapping tables MAP1 to MAP4 may be stored in the buffer memory BM. Here, the first to fourth mapping tables MAP1 to MAP4 may correspond to an example of the metadata groups MD1 to MDn. The journal manager JM may update the prediction times for the first to fourth mapping tables MAP1 to MAP4 in the journal time table 131.

In some example embodiments, on condition of the total prediction time exceeding the threshold time (e.g., 40 μs) in the journal time table 131, the journal manager JM may select the second mapping table MAP2 having the longest prediction time and may determine the second mapping table MAP2 as the latest mapping table. Accordingly, the memory controller 100 may program the second mapping table MAP2 to the non-volatile memory 200. For example, a journal log set JLS2', which is programmed to the non-volatile memory 200 together with the second mapping table MAP2, may be determined to be in an empty state in which the journal logs are not included. However, one or more embodiments are not limited thereto.

Then, the journal manager JM may update the journal time table 131 as a journal time table 131'. According to the journal time table 131', a total prediction time taken to update the first to fourth mapping tables MAP1 to MAP4 may be 30 μs, which may be shorter than an open time. Therefore, a maximum response time of the storage device 10 may be within the open time.

Figure 14:
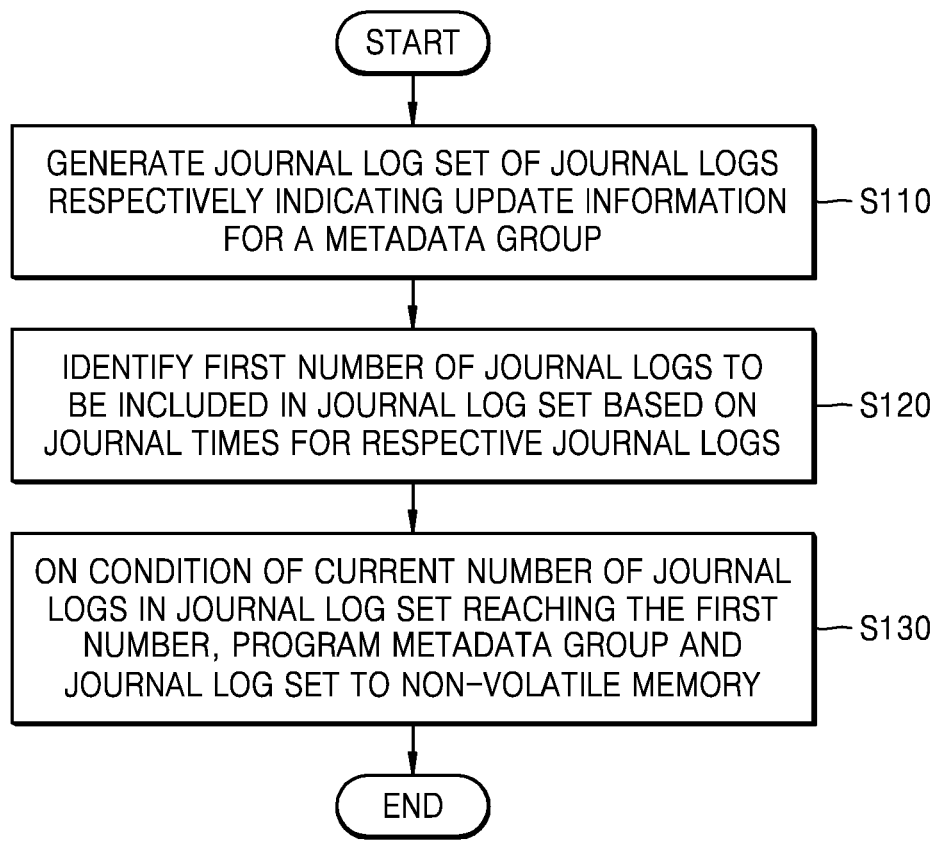
FIG. 14 is a flowchart of an example method of managing metadata for a non-volatile memory, according to some example embodiments.

FIG. 14 is a flowchart of an example method of managing metadata for a non-volatile memory 200, according to some example embodiments. Although the operations in the flowchart of FIG. 14 and other such flowcharts are presented in a certain order, it is to be appreciated that the order may vary in some example embodiments; for example, operations may be performed in a different order, and/or may be performed iteratively and/or concurrently with other operations.

In operation S110, the example method involves generating a journal log set JLS of journal logs JL respectively indicating update information for a metadata group MD. The generating may be performed, for example, by control circuitry CC configured to operate as a journal manager JM.

In operation S120, the example method involves identifying a first number of journal logs JL to be included in a journal log set JLS, based on journal times for the respective journal logs JL. The identifying may be performed, for example, by control circuitry CC configured to operate as a journal manager JM.

In operation S130, the example method involves, on condition of a current number of journal logs JL in the journal log set JLS reaching the first number, programming the metadata group MD and the journal log set JLS to the non-volatile memory.

Figure 15:
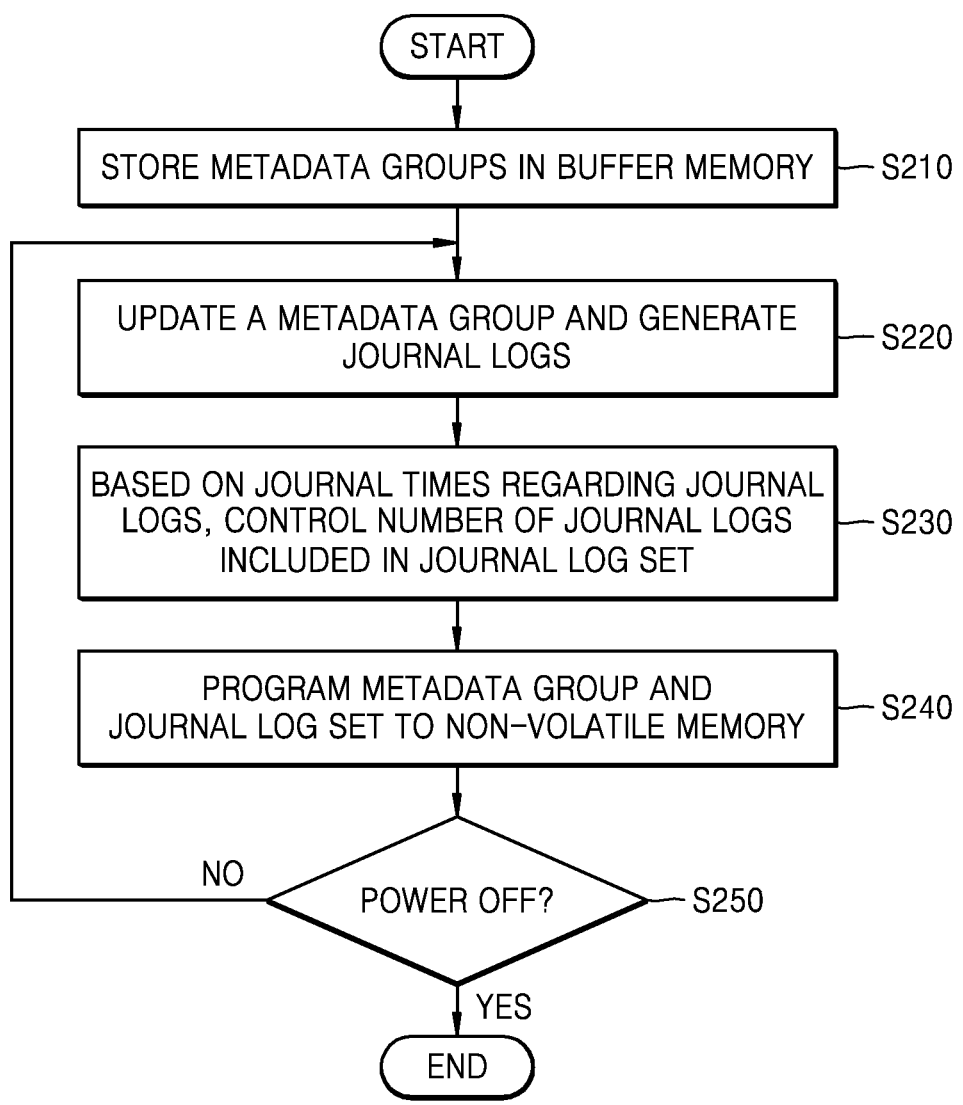
FIG. 15 is a flowchart of an example method of operating a memory controller, according to some example embodiments.

FIG. 15 is a flowchart of an example method of operating a memory controller, according to some example embodiments.

Referring to FIG. 15, the example method according to some example embodiments may correspond to a method of managing metadata groups and journal log sets during a run time of a storage device. The example method according to some example embodiments may include operations that are time-serially performed by the memory controller 100 of FIG. 1. The descriptions provided with reference to FIGS. 1 to 14 may be applied to some example embodiments, and some features of FIGS. 1 to 14 may apply even if not described in the context of FIG. 15.

In operation S210, the memory controller 100 stores a plurality of metadata groups MD1 to MDn in the buffer memory BM. In operation S220, the memory controller 100 updates a metadata group of the plurality of metadata groups MD1 to MDn and generates journal logs indicating update information of the metadata group. In operation S230, the memory controller 100 controls the number of journal logs included in the journal log set JLS for the metadata group based on journal times for the journal logs. On condition of the current number of journal logs in the journal log set JLS reaching a first number, operation S240 may be performed.

In operation S240, the memory controller 100 programs the metadata group and the journal log set for the metadata group to non-volatile memory. In operation S250, whether power off occurs in the storage device 10 is determined. As a result of determination, on condition of power loss, the example method ends, and on condition of continuation of power, operation S220 may be performed. In order to enter a controlled power-off state, all of the metadata groups updated to the buffer memory BM are programmed to the non-volatile memory 200, and then power supplied to the storage device 10 may be blocked.

Figure 16:
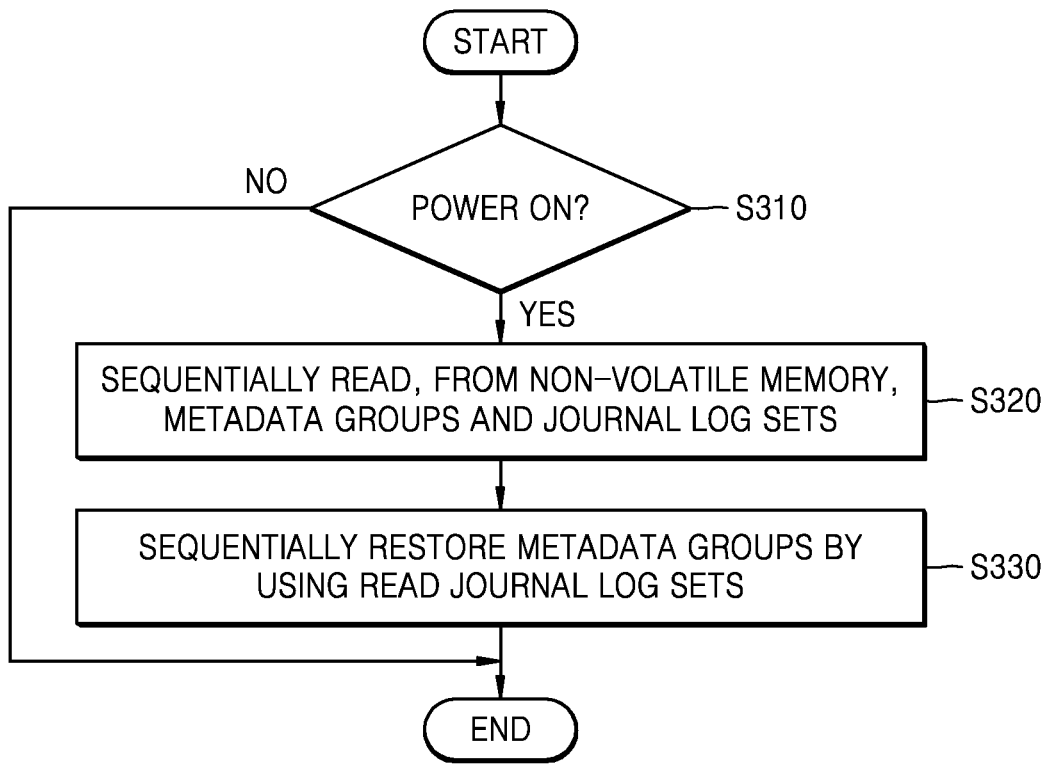
FIG. 16 is a flowchart of an example method of operating a memory controller, according to some example embodiments.

FIG. 16 is a flowchart of an example method of operating a memory controller, according to some example embodiments.

Referring to FIG. 16, the example method according to some example embodiments may correspond to an example method of managing metadata groups after the storage device is powered on. For example, the example method according to some example embodiments may be performed after the example method of FIG. 15. The example method according to some example embodiments may include, for example, operations that are time-serially performed by the memory controller 100 of FIG. 1. The descriptions provided with reference to FIGS. 1 to 15 may be applied to some example embodiments, and some features of FIGS. 1 to 15 may apply even if not described in the context of FIG. 16.

In operation S310, the memory controller 100 determines whether the storage device 10 is in a power-on state. As a result of determination, on condition of powering on the storage device 10, the memory controller 100 sequentially reads the metadata groups and journal log sets from the non-volatile memory 200, in operation S320. In operation S330, the memory controller 100 may use the read journal log sets to sequentially restore the metadata groups.

Figure 17:
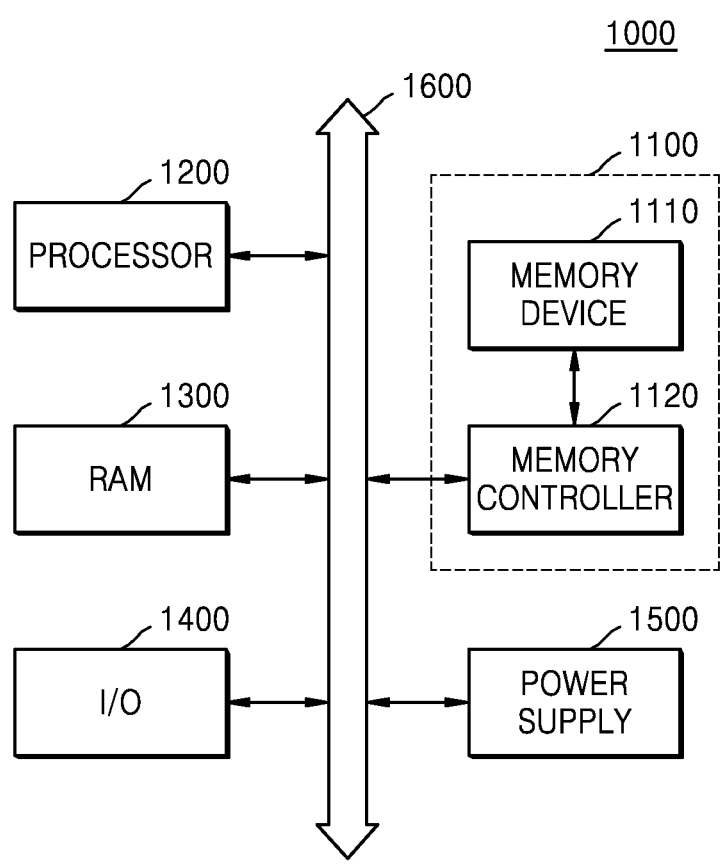
FIG. 17 is a block diagram of a computing system according to some example embodiments.

FIG. 17 is a block diagram of a computing system 1000 according to some example embodiments.

Referring to FIG. 17, the computing system 1000 may include a memory system 1100, a processor 1200, RAM 1300, an input/output device 1400, and a power supply 1500. The memory system 1100 may include a memory device 1110 and a memory controller 1120. Although not shown in FIG. 17, the computing system 1000 may further include ports capable of communicating with a video card, a sound card, a memory card, a USB device, and the like or with other electronic devices. The computing system 1000 may be realized as a PC or a portable electronic device such as a laptop computer, a mobile phone, a PDA, or a camera.

The processor 1200 may perform certain calculations or tasks. According to some example embodiments, the processor 1200 may include a micro-processor or a CPU. The processor 1200 may communicate with the RAM 1300, the input/output device 1400, and the memory system 1100 via a bus 1600 such as an address bus, a control bus, or a data bus. In this case, the memory system 1100 may be realized by using some example embodiments, such as those shown in FIGS. 1 to 16. According to some example embodiments, the processor 1200 may be connected to an expansion bus such as a peripheral component interconnect (PCI) bus.

In some example embodiments, instructions may be stored in a memory, which may be non-volatile and/or non-transitory. For example, the RAM 1300 may store therein data necessary to operate the computing system 1000. For example, the RAM 1300 may be realized as dynamic random-access memory (DRAM), mobile DRAM, static random-access memory (SRAM), parameter random-access memory (PRAM), ferroelectric random-access memory (FRAM), resistive random-access memory (RRAM), and/or magnetoresistive random-access memory (MRAM). The input/output device 1400 may include input devices such as a keyboard, a keypad, and a mouse and output devices such as a printer and a display. The power supply 1500 may supply an operation voltage necessary to operate the computing system 1000.

While some of the inventive concepts of the present disclosure have been shown and described with reference to some example embodiments thereof, it will be understood that various changes in form and details may be made therein without departing from the spirit and scope of the following claims.

As used herein, terms such as "when" and "while" may, but are not necessarily intended to, imply a chronological relationship such as a sequence of events. For example, operations that are described as occurring "when" or "while" a condition is fulfilled may be performed concurrently with the fulfillment of the condition, or during the fulfillment of the condition, or after the fulfillment of the condition, or because the condition is fulfilled or has been fulfilled, etc. Similarly, phrases such as "on condition of" that associate an operation with a condition may indicate that the operation is performed concurrently with the fulfillment of the condition, or during the fulfillment of the condition, or after the fulfillment of the condition, or because the condition is fulfilled or has been fulfilled, etc. All such interpretations that are reasonably and logically possible, and that are not contradictory with other statements, are intended to be included in this disclosure, the scope of which is to be understood as being limited only by the claims.

What is claimed is:

1. A memory controller comprising:
a buffer memory configured to store a plurality of metadata groups and a journal log set for a metadata group of the plurality of metadata groups, wherein the journal log set includes a plurality of journal logs respectively indicating update information for ones of the plurality of metadata groups; and
control circuitry configured to,
identify journal times taken to execute respective journal logs of the plurality of journal logs,
identify a prediction time taken to update the metadata group based on the journal log set, and control a number of journal logs included in the journal log set based on the journal times and the prediction time.

2. The memory controller of claim 1, wherein
the control circuitry is further configured to determine a time slice corresponding to the journal log set, and
the control circuitry performs the control of the number of journal logs based on the journal times, the prediction time, and the time slice.

3. The memory controller of claim 2, wherein the control circuitry is further configured to determine the time slice based on a number of metadata groups in the plurality of metadata groups.

4. The memory controller of claim 1, wherein the control circuitry is further configured to sequentially generate a plurality of journal log sets corresponding to a number of metadata groups in the plurality of metadata groups.

5. The memory controller of claim 4, wherein
the control circuitry is further configured to determine a time window corresponding to the plurality of journal log sets, and
the control circuitry performs the control of the number of journal logs included in each of the plurality of journal log sets based on the journal times, the prediction time, and the time window.

6. The memory controller of claim 5, wherein the control circuitry is further configured to, on condition of an accumulated prediction time for previously generated journal log sets exceeding a threshold time, reduce the number of journal logs included in a next generated journal log set.

7. The memory controller of claim 4, wherein
the control circuitry is configured to perform the identifying of the prediction time based on the journal times of the journal logs of the journal log set, and
the control circuitry is further configured to update the prediction time in a journal time table.

8. The memory controller of claim 4, wherein
the control circuitry is configured to perform the identifying of the prediction time based on the journal times for the journal logs of the journal log set for the metadata group, and
the control circuitry is further configured to store the prediction time for the metadata group in a journal time table.

9. The memory controller of claim 8, wherein the control circuitry is further configured to,
select, from the plurality of metadata groups, a first metadata group for which the prediction time exceeds a threshold time,
identify the first metadata group as a latest metadata group, and
program the latest metadata group to non-volatile memory.

10. The memory controller of claim 8, wherein the control circuitry is further configured to, on condition of a total prediction time for the plurality of metadata groups exceeding a threshold time,
select a second metadata group for which the prediction time is a longest prediction time among the plurality of metadata groups,
identify the second metadata group as a longest metadata group, and
program the longest metadata group to non-volatile memory.

11. The memory controller of claim 1, wherein the plurality of metadata groups includes a plurality of mapping tables.

12. The memory controller of claim 1, wherein the control circuitry is further configured to,
determine a first number of journal logs included in the journal log set, and
on condition of a current number of journal logs included in the journal log set reaching the first number, program the metadata group and the journal log set for the metadata group to non-volatile memory.

13. A storage device comprising:
non-volatile memory; and
a memory controller including control circuitry that is configured to,
store a plurality of metadata groups and a journal log set for a metadata group of the plurality of metadata groups, wherein the journal log set includes a plurality of journal logs respectively indicating update information for ones of the plurality of metadata groups,
identify journal times taken to execute respective journal logs of the plurality of journal logs, and
control a number of journal logs included in the journal log set by,
identifying a first number based on the journal times, and
on condition of a current number of journal logs included in the journal log set reaching the first number, program, to the non-volatile memory, one of the plurality of the metadata groups and the journal log set for the one of the plurality of metadata groups.

14. The storage device of claim 13, wherein
the plurality of metadata groups include a first metadata group and a second metadata group, and
the control circuitry is further configured to, on application of power to the storage device,
read the first metadata group and a first journal log set corresponding to the first metadata group from the non-volatile memory,
read the second metadata group and a second journal log set corresponding to the second metadata group from the non-volatile memory, and
update the first metadata group by using the second journal log set.

15. The storage device of claim 14, further comprising:
a buffer memory in which the first metadata group and the second metadata group are loaded.

16. The storage device of claim 14, wherein
the non-volatile memory includes a first memory group and a second memory group, and
the control circuitry is further configured to store the first metadata group and the first journal log set in the first memory group and store the second metadata group and the second journal log set in the second memory group.

17. The storage device of claim 13, wherein
the control circuitry is further configured to predict, based on journal times of the respective journal logs of the journal log set, a prediction time taken to update the plurality of metadata groups based on the journal log set, and
the control circuitry performs the control of the number of journal logs included in the journal log set based on the journal times and the prediction time.

18. The storage device of claim 17, wherein
the control circuitry is further configured to determine a time slice corresponding to the journal log set based on a number of metadata groups in the plurality of metadata groups, and
the control circuitry performs the control of the number of journal logs included in the journal log set based on the journal times, the prediction time, and the time slice.

19. The storage device of claim 17, wherein
the control circuitry is further configured to,
sequentially generate a plurality of journal log sets corresponding to a number of metadata groups in the plurality of metadata groups, and
determine a time window corresponding to the plurality of journal log sets, and
the control of the number of journal logs included in each of the plurality of journal log sets is based on the journal times, the prediction time, and the time window.

20. A method of managing metadata for a non-volatile memory, the method comprising:
generating a journal log set of journal logs respectively indicating update information for a metadata group; and
identifying a first number of journal logs to be included in the journal log set, based on journal times for respective journal logs; and
on condition of a current number of journal logs in the journal log set reaching the first number, programming the metadata group and the journal log set to the non-volatile memory.

\* \* \* \* \*